(12) United States Patent
Nachenberg et al.

(10) Patent No.: US 8,997,190 B2
(45) Date of Patent: Mar. 31, 2015

(54) USING METADATA IN SECURITY TOKENS TO PREVENT COORDINATED GAMING IN A REPUTATION SYSTEM

(71) Applicant: Symantec Corporation, Mountain View, CA (US)

(72) Inventors: Carey Nachenberg, Northridge, CA (US); Zulfikar Ramzan, Cupertino, CA (US)

(73) Assignee: Symante Corporation, Mountain View, CA (US)

( * ) Notice: Subject to any disclaimer, the term of this patent is extended or adjusted under 35 U.S.C. 154(b) by 0 days.

(21) Appl. No.: 14/036,311

(22) Filed: Sep. 25, 2013

(65) Prior Publication Data

US 2014/0026199 A1 Jan. 23, 2014

Related U.S. Application Data

(62) Division of application No. 12/559,976, filed on Sep. 15, 2009, now Pat. No. 8,621,654.

(51) Int. Cl.
*H04L 29/06* (2006.01)
*G06F 21/33* (2013.01)
(Continued)

(52) U.S. Cl.
CPC ............... *H04L 63/08* (2013.01); *G06F 21/33* (2013.01); *G06F 21/552* (2013.01); *G06F 21/56* (2013.01);
(Continued)

(58) Field of Classification Search
CPC ....... G06F 21/33; G06F 21/552; G06F 21/56; G06F 21/577; G06F 2221/2111; H04L 63/105; H04L 63/08

USPC ........................................ 726/6, 5, 21, 27–29
See application file for complete search history.

(56) References Cited

U.S. PATENT DOCUMENTS 5,878,144 A 3/1999 Aucsmith et al.
2001/0037211 A1 11/2001 McNutt et al.
(Continued)

FOREIGN PATENT DOCUMENTS

CN 101335721 A 12/2008
CN 101399683 A 4/2009
(Continued)

OTHER PUBLICATIONS

Canadian Office Action, Canadian Application No. 2,770,222, Dec. 30, 2013, 3 pages.
(Continued)

*Primary Examiner* — Chau Le
(74) *Attorney, Agent, or Firm* — Fenwick & West LLP

(57) ABSTRACT

To prevent gaming of a reputation system, a security token is generated for a security module using metadata about the client observed during the registration of the security module. The registration server selects metadata for use in generating the security token. The generated security token is provided to identify the client in later transactions. A security server may conduct a transaction with the client and observe metadata about the client during the transaction. The security server also extracts metadata from the security token. The security server correlates the observed metadata during the transaction with the extracted metadata from the security token. Based on the result of the correlation, a security policy is applied. As a result, the metadata in the security token enables stateless verification of the client.

20 Claims, 6 Drawing Sheets

(51) Int. Cl.
  *G06F 21/55* (2013.01)
  *G06F 21/56* (2013.01)
  *G06F 21/57* (2013.01)
(52) U.S. Cl.
  CPC ............ *G06F 21/577* (2013.01); *H04L 63/105* (2013.01); *G06F 2221/2101* (2013.01); *G06F 2221/2111* (2013.01); *G06F 2221/2115* (2013.01); *G06F 2221/2117* (2013.01)
  USPC ......... 726/5; 726/21; 726/27; 726/28; 726/29

(56) References Cited

U.S. PATENT DOCUMENTS

| | | | |
|---|---|---|---|
| 2002/0184509 | A1 | 12/2002 | Scheidt et al. |
| 2003/0217137 | A1* | 11/2003 | Roese et al. ................... 709/223 |
| 2004/0250074 | A1* | 12/2004 | Kilian-Kehr ................... 713/172 |
| 2005/0114452 | A1 | 5/2005 | Prakash |
| 2005/0154924 | A1 | 7/2005 | Scheidt et al. |
| 2005/0198181 | A1 | 9/2005 | Ritter |
| 2006/0253581 | A1 | 11/2006 | Dixon et al. |
| 2007/0094716 | A1* | 4/2007 | Farino et al. ....................... 726/5 |
| 2008/0059215 | A1 | 3/2008 | Boyd |
| 2008/0256622 | A1 | 10/2008 | Neystadt et al. |
| 2008/0280626 | A1* | 11/2008 | Choi et al. .................. 455/456.1 |
| 2009/0006569 | A1* | 1/2009 | Morss et al. ................... 709/206 |
| 2009/0158404 | A1* | 6/2009 | Hahn et al. ......................... 726/5 |
| 2009/0282476 | A1 | 11/2009 | Nachenberg et al. |
| 2009/0328140 | A1* | 12/2009 | McPherson et al. .............. 726/2 |

FOREIGN PATENT DOCUMENTS

| | | |
|---|---|---|
| CN | 101459718 A | 6/2009 |
| JP | 2005-043351 A | 2/2005 |
| JP | 2007-164465 A | 6/2007 |
| JP | 2011-527046 A | 10/2011 |
| WO | WO 2005/043351 A2 | 5/2005 |

OTHER PUBLICATIONS

PCT Notification of Transmittal of the International Preliminary Report on Patentability, PCT Application No. PCT/US2010/045022, Feb. 14, 2012, 18 pages.

Written Opinion of the International Preliminary Examining Authority, PCT Application No. PCT/US2010/045022, Nov. 18, 2011, 10 pages.

PCT International Search Report and Written Opinion, PCT Application No. PCT/US2010/048408, Apr. 7, 2011, 18 pages.

PCT International Search Report and Written Opinion, PCT Application No. PCT/US2010/045022, Nov. 2, 2010, 12 pages.

Ferreres, A.I.G.L.-T. et al., "Spatial Temporal Certification Framework and Extension of X.509 Attribute Certificate Framework and SAML Standard to Support Spatial-Temporal Certificates," Public Key Infrastructure, Lecture Notes in Computer Science, Springer, Jun. 28, 2007, pp. 321-329.

Harrison, R. et al., "Lightweight Directory Access Protocol (LDAP): Authentication Methods and Security Mechanisms; RFC4513.txt," IETF Standard, Internet Engineering Task Force, IETF, CH, Jun. 2006, 34 pages.

"HNBs Location Certification," Mitsubishi Electric, 3GPP Draft; R3-080065 (HBNS Location Certification), 3$^{rd}$ Generation Partnership Project (3GPP), Feb. 11-15, 2008, Sorrento, Italy, 3 pages.

Park, J.S., "Smart Certificates: Extending X.509 for Secure Attribute Services on the Web," National Information Systems Security Conference, 1999, pp. 337-348.

PCT Invitation to Pay Additional Fees, PCT Application No. PCT/US2010/048408, Dec. 1, 2010, 9 pages.

Ramsdell et al., "Secure/Multipurpose Internet Mail Extensions (S/MIME) Version 3.2, Certificate Handling," Internet Engineering Task Force, Standard Working Draft, Internet Society (ISOC), Apr. 27, 2009, 20 pages.

Prakash, V.V. et al., "A Reputation-Based Approach for Efficient Filtration of Spam," Cloudmark®, Apr. 30, 2007, pp. 1-12, [Online] [Retrieved on Sep. 1, 2009] Retrieved from the Internet<URL: http://www.cloudmark.com/releases/docs/wp_reputation_filtration_10640_406.pdf>.

"From Zero-day to Real-time," McAfee, Inc., 2008, 9 pages.

"Reputation system—Wikipedia, the free encyclopedia," Last Modified May 4, 2010, Wikipedia®, 4 pages, [Online] [Retrieved on May 18, 2010] Retrieved from the Internet<URL:http://en.wikipedia.org/wiki/Reputation_systems>.

"Trend Micro™ Smart Protection Network™—Trend Micro USA," Trend Micro Incorporated, 1989-2010, 1 page [Online] [Retrieved on Mar. 18, 2010] Retrieved from the Internet<URL:http://us.trendmicro.com/us/trendwatch/core-technologies/smart-protection-network/>.

United States Office Action, U.S. Appl. No. 12/559,976, Dec. 6, 2012, 10 pages.

Canadian Office Action, Canadian Application No. 2,763,201, Dec. 9, 2013, 4 pages.

Chinese Office Action, Chinese Application No. 201080032172.7, Apr. 18, 2014, 15 pages (with concise explanation of relevance).

Japanese Office Action, Japanese Application No. P2012-524786, Apr. 1, 2014, 4 pages (with concise explanation of relevance).

Canadian Office Action, Canadian Application No. 2,770,222, Jan. 22, 2015, 4 pages.

European Examination Report, European Application No. 10763489.1, Nov. 20, 2014, 9 pages.

Josang, et al., "A Survey of Trust and Reputation Systems for Online Service Provision," Decision Support Systems, Feb. 10, 2007, pp. 618-644, vol. 43.

* cited by examiner

USING METADATA IN SECURITY TOKENS TO PREVENT COORDINATED GAMING IN A REPUTATION SYSTEM

CROSS REFERENCE TO RELATED APPLICATIONS

This application is a division of U.S. application Ser. No. 12/559,976, filed Sep. 15, 2009, which is incorporated by reference in its entirety

BACKGROUND

1. Field of the Invention

This invention relates generally to computer security and particularly to detecting attempts to manipulate a reputation system for detecting malicious objects.

2. Description of the Related Art

A wide variety of malicious software (malware) can attack modern computers. Malware threats include computer viruses, worms, Trojan horse programs, spyware, adware, crimeware, and phishing websites. Malicious entities sometimes attack servers that store sensitive or confidential data that can be used to the malicious entity's own advantage. Similarly, other computers, including home computers, must be constantly protected from malicious software that can be transmitted when a user communicates with others via electronic mail, when a user downloads new programs or program updates, and in many other situations. The different options and methods available to malicious entities for attack on a computer are numerous.

Conventional techniques for detecting malware, such as signature string scanning, are becoming less effective. Modern malware is often targeted and delivered to only a relative handful of computers. For example, a Trojan horse program can be designed to target computers in a particular department of a particular enterprise. Such malware might never be encountered by security analysts, and thus the security software might never be configured with signatures for detecting such malware. Mass-distributed malware, in turn, can contain polymorphisms that make every instance of the malware unique. As a result, it is difficult to develop signature strings that reliably detect all instances of the malware.

Newer techniques for detecting malware involve the use of reputation systems. A reputation system can determine the reputation of a file or other object encountered on a computer in order to assess the likelihood that the object is malware. One way to develop the reputation for an object is to collect reports from networked computers on which the object is found and base the reputation on information within the reports.

However, because such a reputation system relies on reports from what are essentially unknown parties, it is susceptible to subversion by malicious actors. For example, an entity distributing malware could attempt to "game" the reputation system by submitting false reports indicating that the malware is legitimate. Thus, there is a need for a reputation system that is able to withstand such attempts to subvert its operation.

SUMMARY

The above and other needs are met by a method and computer-readable storage medium for generating a security token for a client of a reputation system and a method of authenticating a client of a reputation system. In this way, a malicious actor that has stolen (or forged) a security token and is using the stolen token in multiple locations, for example, may be detected. An embodiment of the method comprises receiving a registration request from the client of the reputation system. The method further comprises observing metadata about the client and selecting observed metadata about the client for use in a security token. The selected metadata comprise metadata that can be correlated through independent observation of the client. In addition, the method comprises generating the security token, which is derived from the selected metadata, for the client. The method also comprises providing the security token to the client. The client is adapted to use the security token to authenticate the client.

In one embodiment, a method for authenticating a client of a reputation system comprises conducting a transaction with a client in which a security token is received from the client. The method further comprises observing metadata about the client during the transaction and extracting metadata about the client from the security token. In addition, the method comprises correlating the observed metadata with the extracted metadata to determine a degree of correlation. The method applies a security policy determined responsive to the degree of correlation.

Embodiments of the computer-readable medium store computer program instructions for generating a security token for a client of a reputation system, the instructions comprising instructions for receiving a registration request from the client of the reputation system. The instructions further comprise instructions for observing metadata about the client and selecting observed metadata about the client for use in a security token. The selected metadata comprise metadata that can be correlated through independent observation of the client. In addition, the instructions comprise instructions for generating the security token, which is derived from the selected metadata, for the client. The instructions also comprise instructions for providing the security token to the client. The client is adapted to use the security token to authenticate the client.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION

Figure 1:
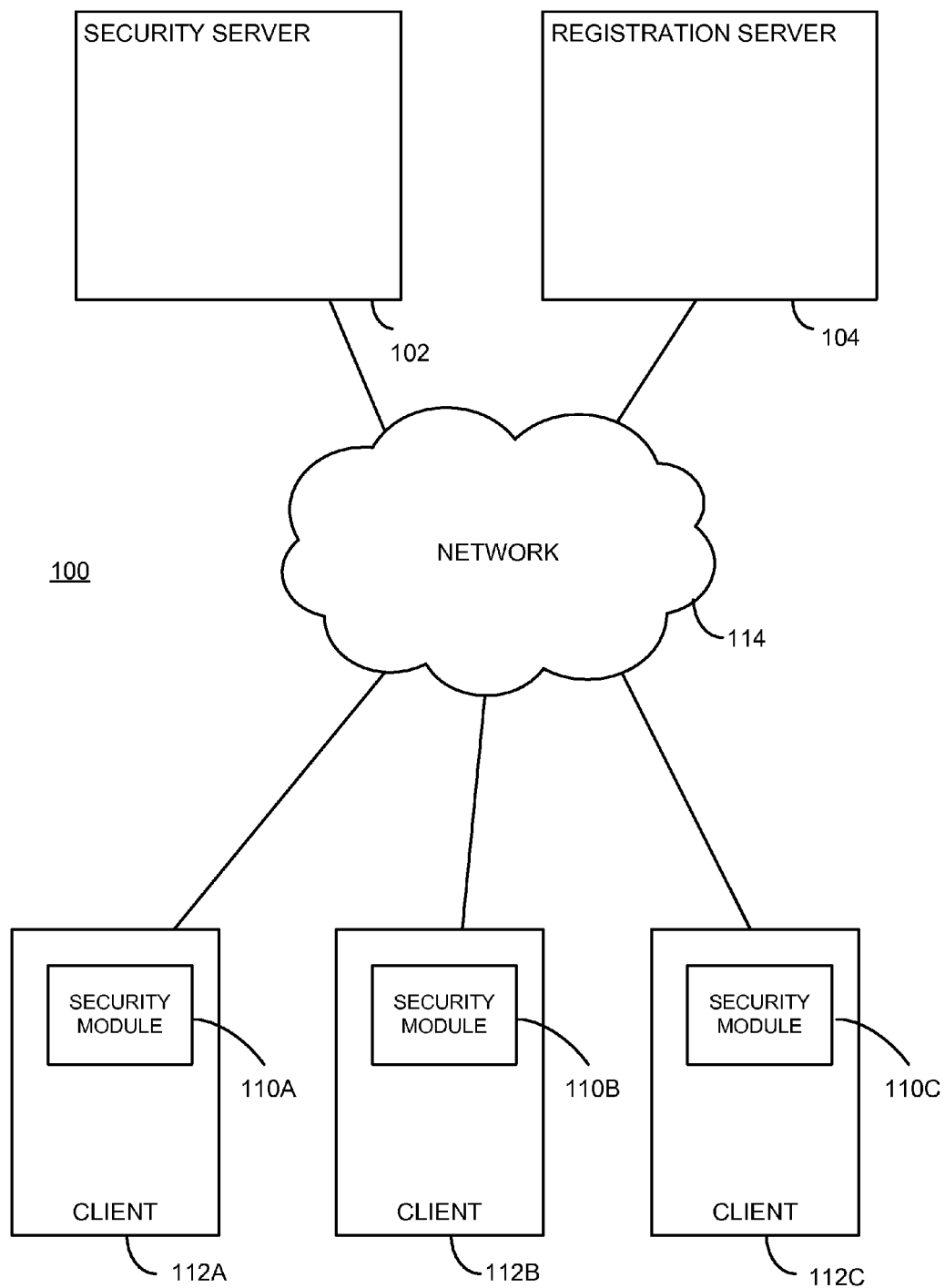
FIG. 1 is a high-level block diagram of a computing environment according to one embodiment of the present invention.

FIG. 1 is a high-level block diagram of a computing environment 100 according to one embodiment. FIG. 1 illustrates a security server 102 connected to a network 114. Also illustrated is a registration server 104 connected to the network 114. The network 114 is also connected to multiple clients 112. Embodiments of the computing environment 100 can have thousands or millions of clients 112, as well as multiple servers 102, 104. In some embodiments, the clients 112 are only connected to the network 114 for a certain period of time or not at all.

FIG. 1 and the other figures use like reference numerals to identify like elements. A letter after a reference numeral, such as "112A," indicates that the text refers specifically to the element having that particular reference numeral. A reference numeral in the text without a following letter, such as "112," refers to any or all of the elements in the figures bearing that reference numeral (e.g. "112" in the text refers to reference numerals "112A," "112B," and/or "112C" in the figures). Only three clients 112 are shown in FIG. 1 in order to simplify and clarify the description.

The client 112 is an electronic device that can host malicious software. In one embodiment, the client 112 is a conventional computer system executing, for example, a Microsoft Windows-compatible operating system (OS), Apple OS X, and/or a Linux distribution. In another embodiment, the client 112 is another device having computer functionality, such as a personal digital assistant (PDA), mobile telephone, video game system, etc. The client 112 typically stores numerous computer files and/or software applications (collectively referred to as "objects") that can host malicious software.

Malicious software, sometimes called "malware," is generally defined as software that executes on the client 112 surreptitiously or that has some surreptitious functionality. Malware can take many forms, such as parasitic viruses that attach to legitimate files, worms that exploit weaknesses in the computer's security in order to infect the computer and spread to other computers, Trojan horse programs that appear legitimate but actually contain hidden malicious code, and spyware that monitors keystrokes and/or other actions on the computer in order to capture sensitive information or display advertisements.

The client 112 executes a security module 110 for detecting the presence of malware. The security module 110 can be, for example, incorporated into the OS of the computer or part of a separate comprehensive security package. In one embodiment, the security module 110 is provided by the entity that operates the security 102 and registration 104 servers. The security module 110 can communicate with the security 102 and registration 104 servers via the network 114.

In one embodiment, the security module 110 registers itself via the network 114 with the registration server 104 when the security module 110 is installed on the client 112 and/or at other times. Two types of information may be gathered during the registration process: 1) data that is submitted by the client, and 2) observable information that can be gleaned from the registration process. The security module 110 may provide certain metadata about the security module 110, client 112, and user of the client to the registration server 104. The metadata can include, for example, the billing address of the user and a description of the physical properties of the client (e.g., the make and model of the client). In addition, the registration server 104 may observe information about the client such as the name of the Internet Service Provider (ISP) that the client is using to connect to the registration server 104 (e.g., AT&T) and the Internet Protocol (IP) address and sub-network (subnet). Upon registration, the security module 110 receives a security token that serves to uniquely identify the client 112.

The security module includes the security token in transactions with the security server 102. In one embodiment, security module 110 submits identifiers of objects detected at the client to the security server 102 and receives reputation scores for the objects in return. The reputation score represents an assessment of the trustworthiness of the object. An object with a high reputation score has a good reputation and is unlikely to contain malware. An object with a low reputation score, conversely, has a poor reputation and might contain malware. The security module 110 uses the reputation score, along with other factors such as behaviors, to evaluate whether an object at the client 112 is malware. The security module 110 can report the outcome of the evaluation to the security server 102.

The registration server 104 interacts with the clients 112 to register the clients and issue security tokens to the clients. In one embodiment, the registration server 104 is operated by the same entity that provides the security modules 110 to the clients and that operates the security server 102. The registration server 104 can include one or more standard computer systems configured to communicate with clients 112 via the network 114.

In one embodiment, the registration server 104 uses metadata about the client 112 and security module 110 to generate the security tokens. The metadata can include the metadata provided by the security module 110 during registration and metadata about the client 112 observed by the registration server 104 during registration. The registration server 104 incorporates the metadata, and/or information derived from the metadata, into the security token issued to the client 112. For example, the information incorporated into the security token can include a description of the IP address used by the client 112 to connect to the network 114 during registration, a description of the geographic location of the billing address and/or IP address, and a description of the physical properties of the client (e.g., whether the client a desktop or laptop computer).

The security server 102 can include one or more standard computer systems configured to communicate with clients 112 via the network 114. The security server 102 receives reports containing identifiers of objects and other information from the clients 112 via the network 114 and sends reputation scores for the objects to the clients 112 via the network 114 in response. The reputation scores of the objects are based on factors such as how often the objects are encountered by the clients 112. Therefore, the reputation scores are in theory susceptible to "gaming." For example, a malicious actor could submit false messages indicating that a malicious object is found on many clients and therefore improperly increase the reputation score for that object.

To prevent such gaming, the security server 102 uses the security tokens to authenticate the clients 112. As mentioned above, clients 112 include their security tokens in transactions with the security server 102. The security server 102 observes metadata about the client 112 transacting with it and compares this observed metadata with the information incorporated into the client's security token. For example, the security server 102 can observe the IP address used by the client 112 when submitting a report and determine the corresponding geographic location. The security server 102 can compare this geographic location to the geographic locations of the IP address and billing address used during the registration of the client 112 as contained within the security token. The security server 102 applies a security policy to the client 112 responsive to the authentication. In one embodiment, if the observed metadata do not match the information in the security token, the client 112 that provided the token is marked as suspicious. Reports from a suspicious client 112 can be discounted or disregarded, depending upon the embodiment.

The information in the security token thus allows for "stateless" verification of the client 112. That is, authentication of the client 112 is based solely on metadata observed during a transaction with the client in comparison with the metadata and information within the security token. Thus, neither the registration server 104 nor the security server 102 need store the security tokens for later look-up, thereby reducing costs and complexity.

The network 114 enables communications between the security server 102 and the clients 112. In one embodiment, the network 114 uses standard communications technologies and/or protocols and comprises the Internet. Thus, the network 114 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 114 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 114 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
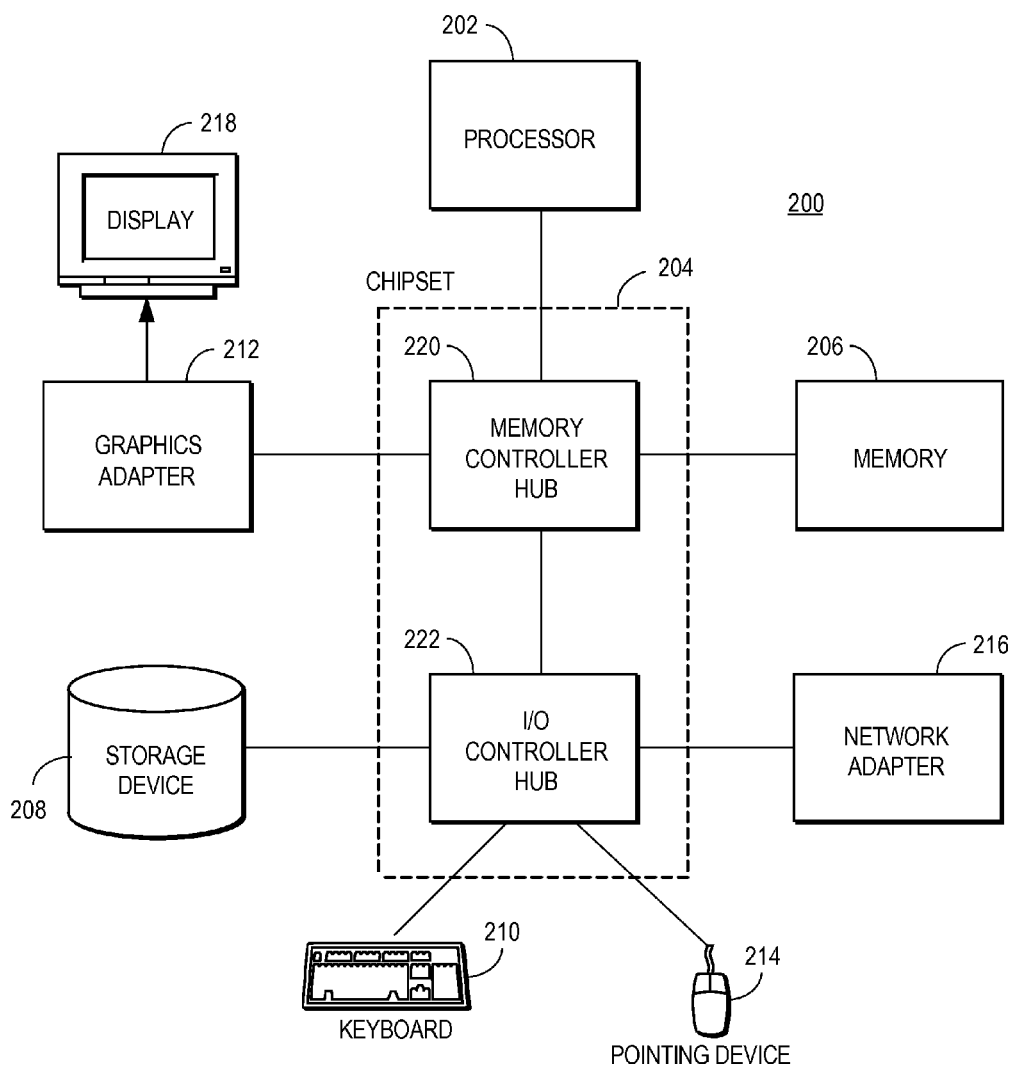
FIG. 2 is a high-level block diagram of a computer for acting as a security server and/or a client according to one embodiment.

FIG. 2 is a high-level block diagram of a computer 200 for acting as a security server 102, registration server 104, and/or a client 112 according to one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to a local or wide area network.

As is known in the art, a computer 200 can have different and/or other components than those shown in FIG. 2. In addition, the computer 200 can lack certain illustrated components. In one embodiment, a computer 200 acting as a security server 102 lacks a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 3:
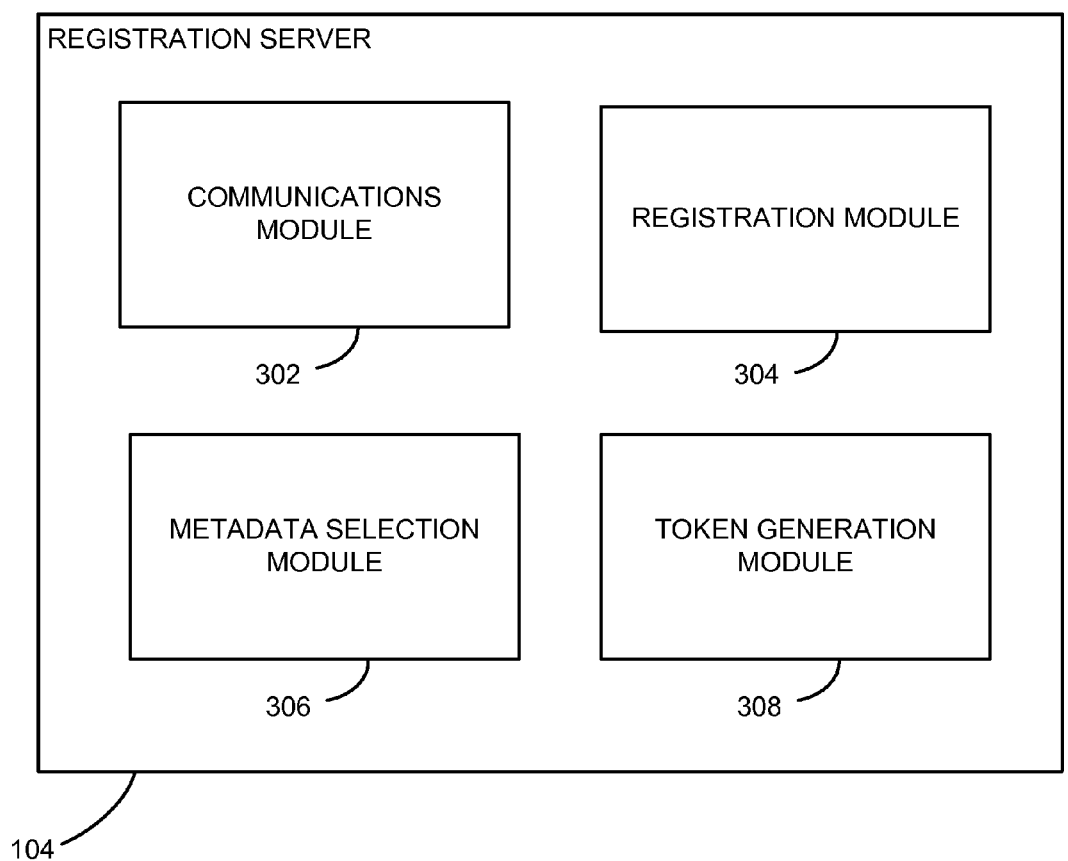
FIG. 3 is a high-level block diagram illustrating modules within the registration server according to one embodiment.

FIG. 3 is a high-level block diagram illustrating a detailed view of modules within the registration server 104 according to one embodiment. As shown in FIG. 3, the registration server 104 includes multiple modules. One of skill in the art will recognize that other embodiments of the registration server 104 may have different and/or other modules than those described here, and that functionalities may be distributed among the modules in various ways.

A communications module 302 interacts with the security modules 110 of the clients 112 via the network 114. The security modules 110 provide information used during registration of the security modules 110, and the communication module 302 provides security tokens to the security modules in response to completed registrations. The communications module 302 interacts with the other modules of the registration server 104 to exchange information between those modules and the client security modules 110.

In one embodiment, the client security modules 110 and communications module 302 communicate using HTTP messages. The communications module 110 thus can observe metadata including the IP addresses used by the security modules 110 during the communications with the registration server 104. In some embodiments, the communications module 110 can observe other metadata about the security modules 110 and/or clients 112 from the network communications, such as a fingerprint of the client's operating system network stack gleaned from the TCP/IP traffic forming the HTTP messages, a media access control (MAC) address of the client or of an intermediate router, the name of the ISP being used by the client to connect to the internet, the subnet of the IP address, and a language of the client's operating system.

A registration module 304 interacts with the security modules 110 in order to perform registration of the security modules. As mentioned above, during registration the registration module 304 collects and observes metadata about the security modules 110, clients 112, and users of the clients. These metadata can include the billing and home addresses of the user, a telephone number for the user, a description of the hardware and software configuration of the client 112 generated by the client security module 110, etc. The registration module 304 verifies certain metadata provided by the security modules 110, e.g., payment information, and registers the security modules when appropriate.

A metadata selection module 306 selects metadata observed by the communications 302 and registration modules 304 that can be used to authenticate the security modules 110 during subsequent transactions. In general, the selected metadata are metadata that can be correlated by independent metadata observed by another entity, such as the security server 102. Such metadata include metadata that can be directly correlated (e.g., is the IP address used in communications with the security server 102 the same as the IP address used in communications with the registration server 104?) and metadata that can be indirectly correlated (e.g., is the IP address used in communications with the security server within the same geographic area as the billing address provided to the registration server?). The selected metadata can thus include the IP address used by the client 112, the name of the ISP being used by the client to connect to the internet, the subnet of the IP address, the billing address provided during registration, the language of the client's operating system, and the like. The selected metadata may also be transformed by a hash function such that the metadata (e.g., the IP address) is not literally included in the token. In one embodiment, the metadata selection module 306 can select multiple independent metadata for use in the security token for the client 112.

A token generation module 308 generates security tokens for the client security modules 110. In one embodiment, a security token includes a cryptographically strong identifier that uniquely identifies a client 112 and/or another entity such as a particular user of the client or instance of a security module 110. For clarity, this description refers to the identifier as identifying a client 112, but it will be understood that the identifier can also identify other entities. The security token can include one or more fields holding encrypted values and be signed with a digital key to prevent tampering.

The token generation module 308 includes the metadata selected by the metadata selection module 306, and/or information derived from the metadata, within fields of the security token. The metadata included in the token can include, for example, the IP address used by the client 112 during registration and data describing the client operating system determined from the TCP/IP communications from the client. Multiple fields of metadata may be included in the security token generated by the token generation module 308. In addition, some embodiments of the token generation module 308 may employ multiple security tokens, where each security token corresponds to a single type of metadata observed and selected (e.g., geographic location).

The information derived from the metadata can include, for example, a geographic location associated with the client IP address. The geographic location can be determined by looking up the IP address within a geolocation database and/or performing a reverse-DNS lookup of the IP address to determine the Internet service provider (ISP) used by the client 112. In one embodiment, the token generation module 308 converts the geographic location into a region, e.g. GEO (155.64.152.71) is 'Southern France.' The token generation module 308 then encodes the region as an ordinal value (e.g., "Southern France" becomes "42"). The module 308 stores the ordinal value in a "region" field of the security token. The derived information can also encode descriptions of the regions encompassing the billing or other addresses provided by the user during registration.

In addition, the derived information can indicate whether the client 112 is a laptop or desktop computer, whether the billing address is within a geographic region known to host malicious actors, and other information that can be used to rate the confidence that the client 112 is not malicious. A client 112 that is a laptop may indicate the potential mobility of the user. Thus, a security policy may be more relaxed towards laptop clients 112 in regards to triggering a location-based security threshold policy, for example. In some embodiments, multiple locations or regions may be derived to identify locales where the client 112 will conduct future transactions. This information is useful because clients do not typically travel far from the region (or regions) where the client 112 registered the security module 110. In one embodiment the metadata and derived information are encrypted within the security token to prevent unauthorized access or tampering.

Figure 4:
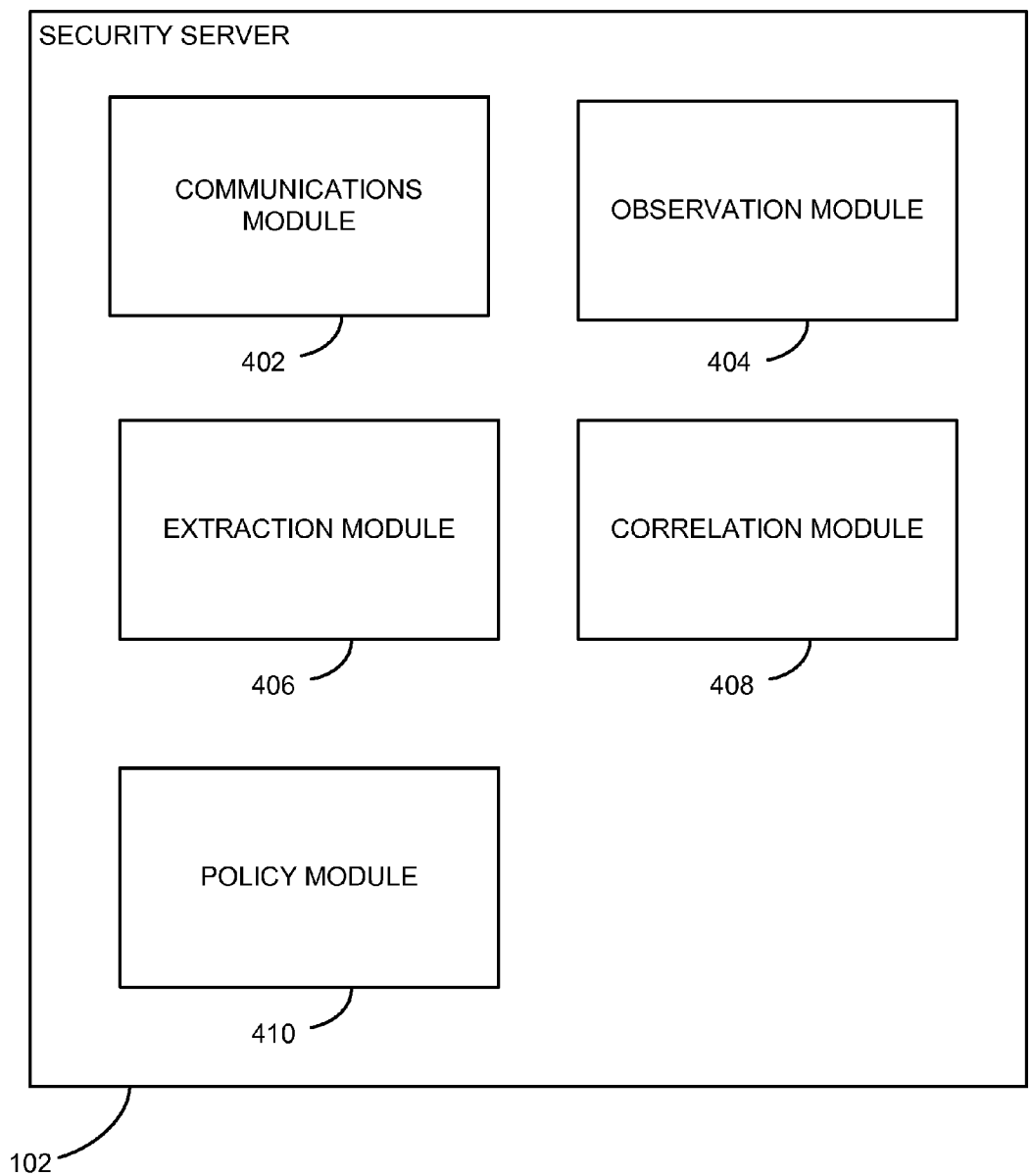
FIG. 4 is a high-level block diagram illustrating a detailed view of modules within the security server according to one embodiment.

FIG. 4 is a high-level block diagram illustrating a detailed view of modules within the security server 102 according to one embodiment. As shown in FIG. 4 the security server 102 includes multiple modules. One of skill in the art will recognize that other embodiments of the security server 102 may have different and/or other modules than those described here, and that functionalities may be distributed among the modules in various ways.

A communications module 402 conducts transactions with the security modules 110 of the clients 112 via the network 114. The communications module 402 receives reports from the security modules 110 containing identifiers of objects detected at the clients 112 and/or requesting the reputations of objects detected at the clients. The reports also include the clients' 112 security tokens. The communications module 402 interacts with the other modules of the security server 102 to exchange information between those modules and the client security modules 110.

An observation module 404 observes metadata about the clients 112 that communicate with the security server 102. In general, the observation module 404 observes data useful for correlating the metadata and information included in the security tokens. Thus, the observation module 404 can observe the IP address used by the client 112, the name of the ISP being used by the client to connect to the internet, the subnet of the IP address, the language of the operating system used by the client 112, a fingerprint of the client's TCP/IP stack, and the like. In one embodiment, a time-series log of the IP addresses used by the client 112 is maintained. As new IP addresses are observed, the observation module 404 records the new IP addresses in the time-series log for the client 112.

An extraction module 406 extracts the metadata and information included in security tokens received from clients 112. As part of the extraction process, an embodiment of the extraction module 406 verifies the digital signature of a security token to ensure that the token has not been altered. The extraction module 406 also decrypts the metadata and information in the token, if necessary. This decryption can be performed, for example, using a key shared with the registration server 104.

A correlation module 408 correlates the metadata and information extracted from the security tokens with the metadata observed by the observation module 404 to determine a degree of correlation. In general, the correlation module 408 determines whether the observed metadata for a client 112 are consistent with the metadata and information in the security token received from the client. For example, the correlation module 408 can determine whether the IP address used by the client 112 when communicating with the security server 102 is the same as the IP address in the security token. Similarly, the correlation module 408 can determine whether the IP address used by the client 112 when communicating with the security server 102 is associated with the same geographic region as the IP address used when the client communicated with the registration server 104, or with the same geographic region as the billing address provided during registration. This geographic correlation can be performed by using a geolocation database as described above with respect to the registration server 104. Depending upon the embodiment, the correlation module 408 can likewise determine whether the operating system language of the client 112 is the same as the language indicated within the security token, whether the name of the ISP being used by the client to connect to the Internet is the same as the name of the ISP indicated within the security token, whether the subnet of the IP address is the same as the subnet indicated within the security token, and whether the TCP/IP stack fingerprint is the same.

The policy module 410 may apply a policy that discounts or disregards reports from the client 112 if the token is invalid (e.g., the digital signature of the token is not valid). The token may be deemed invalid by the policy module 410 for a number of reasons, such as an indication from the extraction module 406 that the token has been forged or altered, a low degree of correlation between the metadata and information extracted from the client's security token and the observed metadata for the client, or failure to meet a threshold validity score based on a number of weighted factors. The factors may include whether a number of metadata included in the security token correlates to the corresponding observed metadata. In one embodiment, reports from clients 112 with invalid tokens are used to identify clients 112 and objects, such as files, that are suspect.

A policy module 410 applies a policy to a client 112 based at least in part on the degree of correlation between the metadata and information extracted from the client's security token and the observed metadata for the client. At a high level, a low degree of correlation between the extracted metadata and information and the observed metadata results in a suspicion that the client 112 is malicious or otherwise untrustworthy. A high degree of correlation, in contrast, results in a presumption that the client 112 is not malicious and is trustworthy.

For example, if the IP address used by the client 112 when communicating with the security server 102 is associated with a geographic location far from the locations indicated by the security token, then there is a possibility that the client 112 is using a forged or stolen security token. Therefore, the policy module 410 can apply a policy that treats the client 112 as suspicious and discounts or disregards reports received from the client. However, if the IP address used by the client 112 is associated with a nearby geographic location from the locations indicated by the security token, the policy module 410 may apply a less stringent policy and allow the transaction with the client 112 to continue.

If other metadata or information in the security token mitigates the lack of correlation, the policy module 410 can apply a policy that recognizes the client 112 as legitimate even though there is a low degree of correlation. For example, if the security token includes information indicating that the client 112 is a laptop computer, the policy module 410 can be more relaxed toward a lack of geographic correlation because the client 112 is potentially mobile. The policy module 410 monitors a time-series log of IP addresses maintained by the observation module 404. In one embodiment, an analysis of the time-series log, in combination with an indication that the client 112 is a laptop computer, may mitigate consistent low degrees of correlation. Thus, the policy module 410 can apply a policy that trusts reports received from the client 112 even though consistent geographic correlation may be lacking.

In one embodiment, the policy module 410 may ascribe different weights to different metadata or derived information selected for use in the security token. For example, the geographic location of the client 112 can have a significant influence on verifying the security token for a client 112, while the indication that the client is a laptop device may have only a minor influence.

In one embodiment, the policy module 410 monitors the time-series log of IP addresses maintained by the observation module 404. If it appears that the client 112 is moving away from the region or location where the client 112 first registered the security module 110, a new security token may be generated by the policy module 410 to use the new location. In one embodiment, a new security token may be generated by the policy module 410 to include the new location in addition to the location observed during registration.

The policy module 410 can apply variations of the policies described above. For example, the policy module 410 can apply a policy that allows responds to a request for a reputation score from a client 112 yet places the client on a blacklist of suspicious or malicious clients if there is a lack of correlation. In one embodiment, the policy module 410 records the results of the correlation in a time-series log. The policy module 410 uses the log to assess a confidence level of the client 112 over time, and applies a policy based on this assessment.

Figure 5:
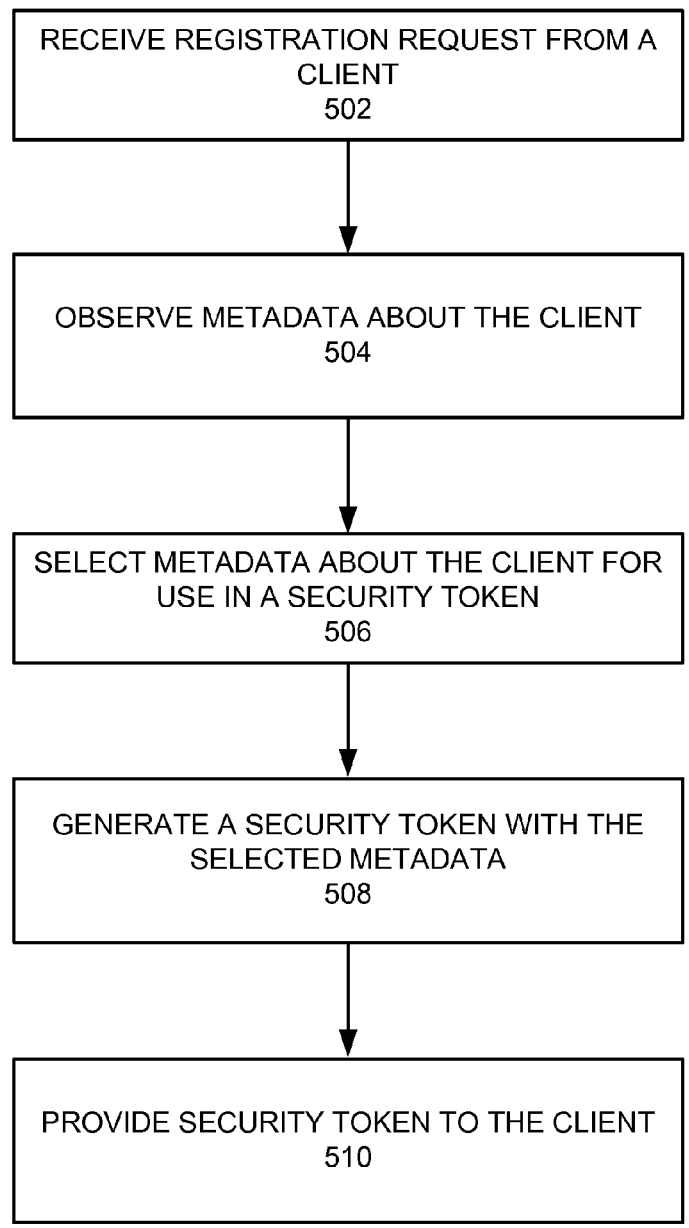
FIG. 5 is a flowchart illustrating the operation of the registration server in generating security tokens for clients according to one embodiment.

FIG. 5 is a flowchart illustrating the operation of the registration server 104 in generating security tokens for clients 112 according to one embodiment. It should be understood that these steps are illustrative only. Different embodiments of the registration server 104 may perform the steps in different orders, omit certain steps, and/or perform additional steps not shown in FIG. 5.

As shown in FIG. 5, the registration server 104 receives 502 a registration request from a client 112. The registration server 104 observes metadata 504 about the client 112 during the registration. The observed metadata can include metadata observed from communications with the client 112, such as the IP address used by the client. The observed metadata can also include metadata provided by a user of the client 112 during registration, such as the user's billing address. The registration server 104 selects 506 metadata about the client 112 for use in the security token, and generates 508 a security token including the metadata and/or information derived from the metadata, such as a hash of the metadata. The registration server 104 provides 510 the security token to the client 112.

Figure 6:
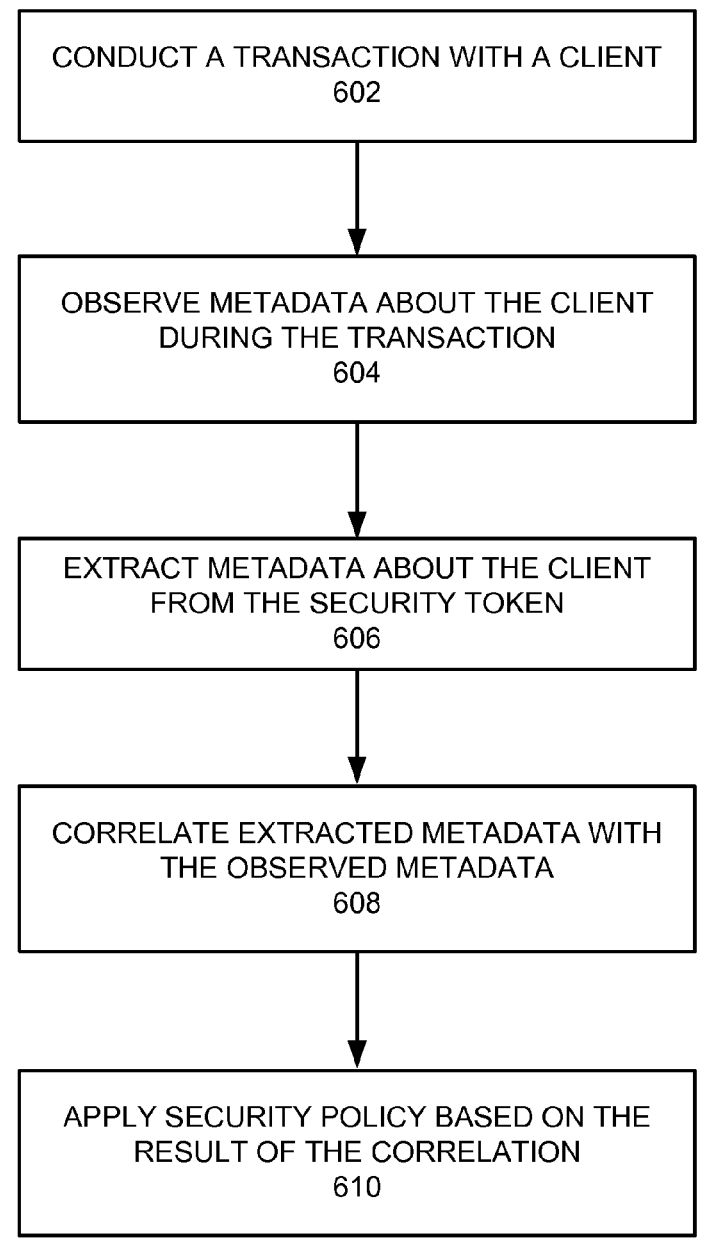
FIG. 6 is a flowchart illustrating the operation of the security server according to one embodiment.

FIG. 6 is a flowchart illustrating the operation of the security server 102 according to one embodiment. It should be understood that these steps are illustrative only. Different embodiments of the security server 102 may perform the steps in different orders, omit certain steps, and/or perform additional steps not shown in FIG. 6.

As shown in FIG. 6, the security server 102 conducts 602 a transaction with a client 112. For example, the security server 102 can receive a submission or query from a client 112. The security server 102 receives a security token from the client 112 as part of the transaction. The security server 102 observes 604 metadata about the client 112 during the transaction. The metadata includes, for example, the IP address used by the client 112 during the transaction. The security sever 102 also extracts 606 metadata and information from the security token provided by the client 112 and correlates 608 the extracted data and information with the observed metadata. In one embodiment, the subnet may be included in the metadata that is extracted 606 from the security token and may be correlated 608 to the subnet of the observed IP address. The security server 102 applies 610 a policy to the client 112 based on the degree of correlation. For example, the security server 102 can apply a policy that discounts or disregards submissions from the client 112 if there is a low degree of correlation.

The techniques described above may be applicable to various other types of detection systems, such as spam filters for messaging applications and other mechanisms designed to detect malware that utilize reputation scores of objects and confidence metrics of clients. While the techniques cannot guarantee that a report containing a security token is coming from the exact same client 112 to which the token was issued, it increases the difficulty of a malicious actor stealing the token and using it on other clients such as would occur in a distributed botnet attack.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method of using a computer to generate a security token for a client of a reputation system, comprising:
   receiving a registration request from the client of the reputation system;
   observing metadata about the client;
   selecting observed metadata about the client for use in a security token, wherein the selected metadata comprise metadata that can be correlated through independent observation of the client;
   determining whether the observed metadata indicates that the client is potentially mobile;
   generating the security token for the client, the security token derived from the selected metadata and including an indication that the client is potentially mobile responsive to the observed metadata indicating that the client is potentially mobile; and
   providing the security token to the client, wherein the client is adapted to use the security token and the indication that the client is potentially mobile to authenticate the client.

2. The method of claim 1, wherein generating the security token comprises:
   identifying a geographic region associated with the client responsive to the observed metadata; and
   encoding a representation of the geographic region associated with the client within the security token.

3. The method of claim 2, wherein encoding a representation of the geographic region comprises:
   converting the identified geographic region into an ordinal representation of the region; and
   encoding the ordinal representation of the region into a field of the security token.

4. The method of claim 2, wherein identifying a geographic region associated with the client comprises:
   observing an Internet Protocol (IP) address used by the client in making the registration request; and
   determining a geographic region associated with the observed IP address.

5. The method of claim 2, wherein identifying a geographic region associated with the client comprises:
   identifying information provided by an end-user of the client during registration; and
   identifying the geographic region responsive to the information provided by the end user.

6. The method of claim 1, wherein observing metadata about the client comprises observing metadata describing a name of an Internet Service Provider (ISP) used by the client and wherein the selected metadata included in the security token comprise the metadata describing the name of the ISP.

7. The method of claim 1, wherein observing metadata about the client comprises observing an IP address of the client comprising a subnet and wherein the selected metadata included in the security token comprise the subnet of the IP address.

8. A non-transitory computer-readable storage medium storing executable computer program instructions for generating a security token for a client of a reputation system, the computer program instructions comprising instructions for:
   receiving a registration request from the client of the reputation system;
   observing metadata about the client;
   selecting observed metadata about the client for use in a security token, wherein the selected metadata comprise metadata that can be correlated through independent observation of the client;
   determining whether the observed metadata indicates that the client is potentially mobile;
   generating the security token for the client, the security token derived from the selected metadata and including an indication that the client is potentially mobile responsive to the observed metadata indicating that the client is potentially mobile; and
   providing the security token to the client, wherein the client is adapted to use the security token and the indication that the client is potentially mobile to authenticate the client.

9. The non-transitory computer-readable storage medium of claim 8, wherein the computer program instructions for generating the security token comprise:
   identifying a geographic region associated with the client responsive to the observed metadata; and
   encoding a representation of the geographic region associated with the client within the security token.

10. The non-transitory computer-readable storage medium of claim 9, wherein the computer program instructions for encoding a representation of the geographic region comprise:
    converting the identified geographic region into an ordinal representation of the region; and
    encoding the ordinal representation of the region into a field of the security token.

11. The non-transitory computer-readable storage medium of claim 9, wherein the computer program instructions for identifying a geographic region associated with the client comprise:
    observing an Internet Protocol (IP) address used by the client in making the registration request; and
    determining a geographic region associated with the observed IP address.

12. The non-transitory computer-readable storage medium of claim 9, wherein the computer program instructions for identifying a geographic region associated with the client comprise:
- identifying information provided by an end-user of the client during registration; and
- identifying the geographic region responsive to the information provided by the end user.

13. The non-transitory computer-readable storage medium of claim 8, wherein the computer program instructions for observing metadata about the client comprise observing metadata describing a name of an Internet Service Provider (ISP) used by the client and wherein the selected metadata included in the security token comprise the metadata describing the name of the ISP.

14. The non-transitory computer-readable storage medium of claim 8, wherein the computer program instructions for observing metadata about the client comprise observing a language used an IP address of the client comprising a subnet and wherein the selected metadata included in the security token comprise the metadata describing the subnet of the IP address.

15. A computer system for generating a security token for a client of a reputation system, comprising:
- a non-transitory computer-readable storage medium storing executable computer program code, the computer program code comprising program code for:
  - receiving a registration request from the client of the reputation system;
  - observing metadata about the client;
  - selecting observed metadata about the client for use in a security token, wherein the selected metadata comprise metadata that can be correlated through independent observation of the client;
  - determining whether the observed metadata indicates that the client is potentially mobile;
  - generating the security token for the client, the security token derived from the selected metadata and including an indication that the client is potentially mobile responsive to the observed metadata indicating that the client is potentially mobile; and
  - providing the security token to the client, wherein the client is adapted to use the security token and the indication that the client is potentially mobile to authenticate the client.

16. The computer system of claim 15, wherein generating the security token comprises:
- identifying a geographic region associated with the client responsive to the observed metadata; and
- encoding a representation of the geographic region associated with the client within the security token.

17. The computer system of claim 16, wherein encoding a representation of the geographic region comprises:
- converting the identified geographic region into an ordinal representation of the region; and
- encoding the ordinal representation of the region into a field of the security token.

18. The computer system of claim 16, wherein identifying a geographic region associated with the client comprises:
- observing an Internet Protocol (IP) address used by the client in making the registration request; and
- determining a geographic region associated with the observed IP address.

19. The computer system of claim 16, wherein identifying a geographic region associated with the client comprises:
- identifying information provided by an end-user of the client during registration; and
- identifying the geographic region responsive to the information provided by the end user.

20. The computer system of claim 15, wherein observing metadata about the client comprises observing metadata describing a name of an Internet Service Provider (ISP) used by the client and wherein the selected metadata included in the security token comprise the metadata describing the name of the ISP.

* * * * *